United States Patent [19]
Moyer et al.

[11] Patent Number: 5,920,690
[45] Date of Patent: Jul. 6, 1999

[54] METHOD AND APPARATUS FOR PROVIDING ACCESS PROTECTION IN AN INTEGRATED CIRCUIT

[75] Inventors: William C. Moyer, Dripping Springs; Claude Moughanni; Taimur Aslam, both of Austin, all of Tex.

[73] Assignee: Motorola, Inc., Schaumburg, Ill.

[21] Appl. No.: 08/907,980

[22] Filed: Aug. 11, 1997

[51] Int. Cl.$^6$ .................................................. G06F 13/00
[52] U.S. Cl. ..................................... 395/186; 395/188.01
[58] Field of Search .................................. 395/860, 879, 395/871, 200.61, 200.31, 200.32, 566, 186, 188.01

[56] References Cited

U.S. PATENT DOCUMENTS 5,375,243  12/1994  Parzych et al. ......................... 395/726
5,586,301  12/1996  Fisherman et al. ...................... 395/186
5,809,230   9/1998  Pereira ..................................... 395/186

*Primary Examiner*—Dennis M. Butler
*Assistant Examiner*—Abu Hossain
*Attorney, Agent, or Firm*—Susan C. Hill

[57] ABSTRACT

A method and apparatus for providing access protection in an integrated circuit (10). In one embodiment access protection circuitry (11) includes access attribute bits (51) which are compared to the access attributes (68) of a memory (14) request. If a mismatch occurs, an access fault signal (52) is asserted. If access fault signal (52) is asserted and a selective reset bit (48) has selected a first memory protection mode, then signal generation circuitry (44) asserts a reset signal (58). Reset signal (58) may be used to initiate a hardware reset of data processor (10). If access fault signal (52) is asserted and a selective reset bit (48) has selected a second memory protection mode, then signal generation circuitry (44) asserts an exception occurred signal (60).

21 Claims, 3 Drawing Sheets

METHOD AND APPARATUS FOR
PROVIDING ACCESS PROTECTION IN AN
INTEGRATED CIRCUIT

FIELD OF THE INVENTION

The present invention relates in general to integrated circuits, and more particularly to a method and apparatus for providing access protection in an integrated circuit.

BACKGROUND OF THE INVENTION

Security is an important issue within the development of integrated circuits. Components and information within these integrated circuits require some way to provide access protection to protect the integrity of these systems. A security system of some form is usually implemented to prevent unauthorized access to particular locations of integrated circuits such as components (e.g. memory) of a data processing system. Trusted software developers are authorized users responsible for all applications on an integrated circuit such as a data processing system. They know of the existence, location, and use of every component and feature within the data processing system. In general, when a data processing system is released to the public, full disclosure of all the features is not given to the general public. They are only informed of those elements that apply to their needs and uses of the integrated circuit. Therefore, these authorized software developers, by having full access to the system, are responsible for all applications within the data processor while only limited information is given to the general users.

A problem arises when unauthorized users access portions of the system that are not available to the general public. These unauthorized users can therefore achieve access to important components and violate the security of the system. This violation gives the unauthorized users important information concerning data or functions within the system, and this information can be detrimental to an integrated circuit such as a data processing system. A technique used to secure portions of a data processing system is to generate an exception fault anytime an access fault is detected. This exception fault is then handled by a software exception handler in a prior art manner. A large problem with a software exception handler arises when unauthorized users detect this software security feature and possibly trace the software in the handler. Unauthorized users can achieve unlimited access and can even override the handler in order to access protected components of the data processor or other integrated circuit. The software exception handler is very susceptible to penetration; therefore, a need exists for a more secure method to prevent unauthorized access to information stored in an integrated circuit.

DESCRIPTION OF THE PREFERRED EMBODIMENT

Description of the Figures

Figure 1:
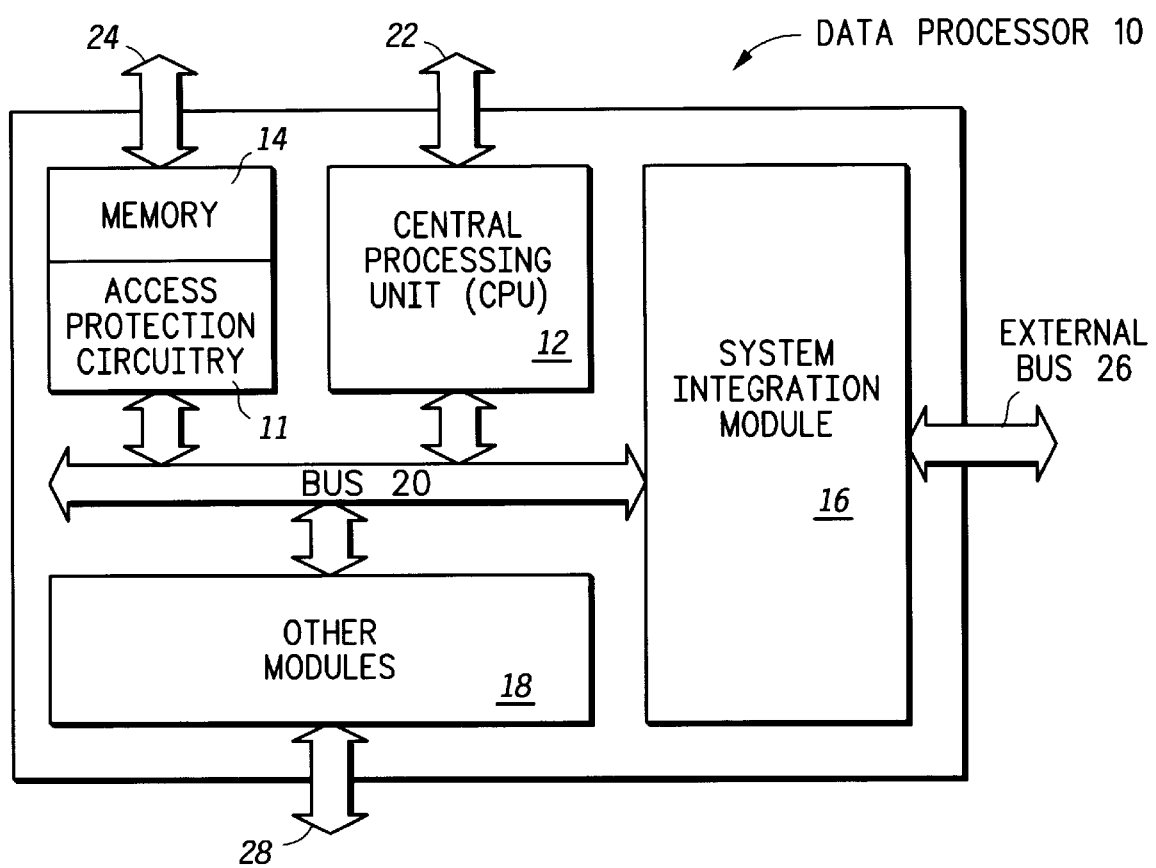
FIG. 1 illustrates, in block diagram form, a data processor 10 in accordance with one embodiment of the present invention.

FIG. 1 illustrates a data processor 10. In one embodiment, data processor 10 includes a central processing unit (CPU) 12, memory 14, system integration module 16, and other modules 18, which are all bi-directionally coupled to each other by way of bus 20. System integration module 16 may be coupled external to data processor 10 by way of external bus 26. Other modules 18 are optionally coupled external to data processor 10 by way of one or more integrated circuit terminals 28. Memory 14 is optionally coupled externally to data processor 10 by way of one or more integrated circuit terminals 24. Central processing unit 12 is optionally coupled external to data processor 10 by way of one or more integrated circuit terminals 22. In one embodiment of the present invention, access protection circuitry 11 is interposed between bus 20 and memory 14 in order to monitor and control accesses to memory 14. In alternate embodiments of the present invention, access protection circuitry 11 may also be interposed between optional integrated circuit terminals 24 and memory 14.

Still referring to FIG. 1, alternate embodiments of the present invention may use any type of structure for data processor 10. In addition, data processor 10 may perform a wide variety of functions. For example, data processor 10 may use a RISC (Reduced Instruction Set Computer) architecture, may use a Harvard architecture, may be a vector processor, may be a SIMD (Single Instruction Multiple Data) processor, may perform floating point arithmetic, may perform digital signal processing computations, etc.

Figure 2:
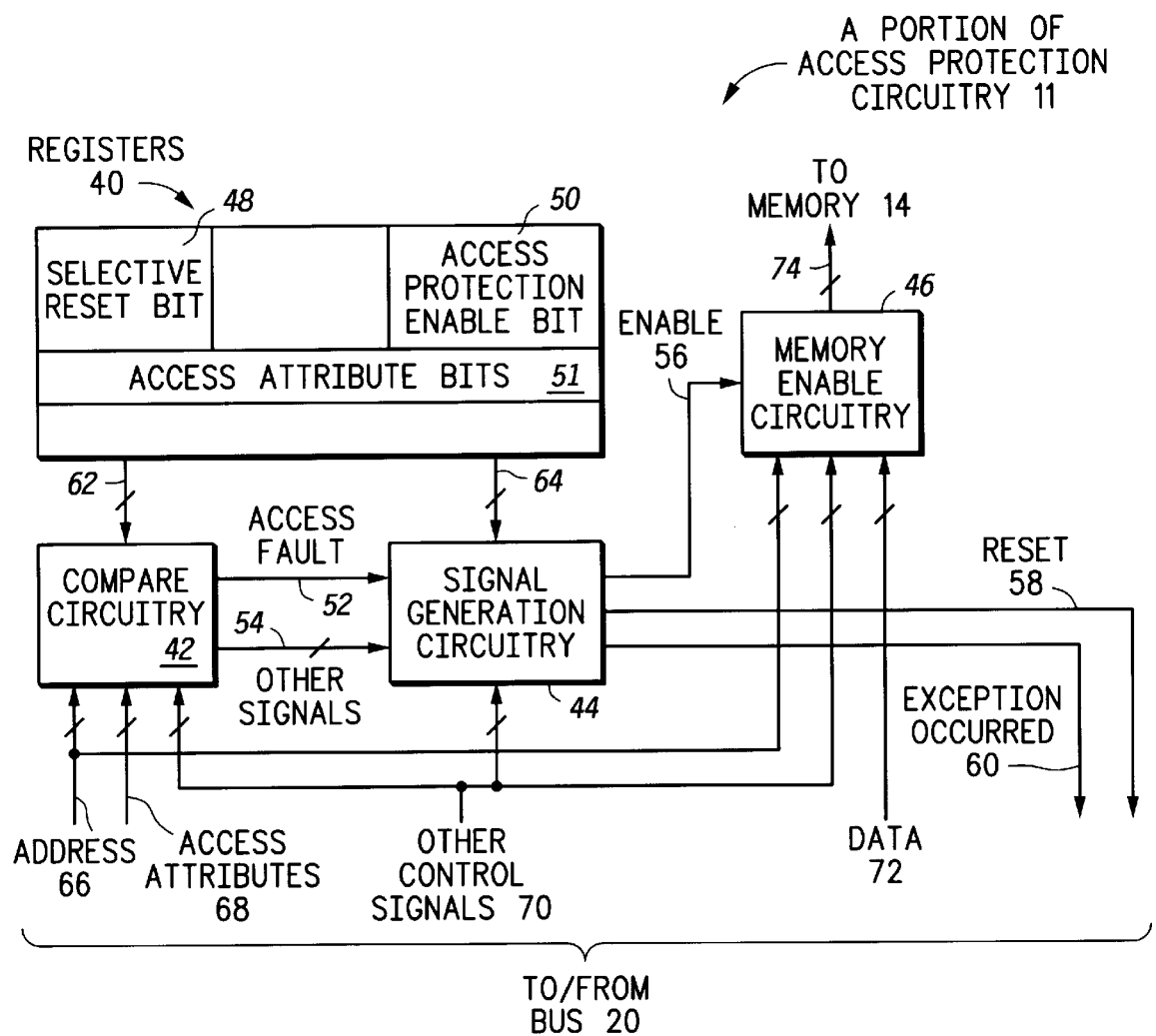
FIG. 2 illustrates, in block diagram form, a portion of access protection circuitry 11 of FIG. 1 in accordance with one embodiment of the present invention.

FIG. 2 illustrates one embodiment of a portion of access protection circuitry 11. In the illustrated embodiment, access protection circuitry 11 includes registers 40, compare circuitry 42, signal generator circuitry 44, and memory enable circuitry 46. Address 66, access attribute 68, and other control signals 70 are provided to the compare circuitry by way of bus 20. The other control signals 70 are also provided to the signal generating circuitry 44 by way of bus 20. Address 66, other control signals 70, and data 72 are all provided to memory enable circuitry 46 by way of bus 20. Registers 40 are coupled to compare circuitry 42 by way of multiple conductors 62 and coupled to signal generating circuitry 44 by way of multiple conductors 64. Compare circuitry 42 is coupled to signal generator circuitry 44 by way of access fault signal 52 as well as other optional signals 54. Signal generating circuitry 44 is also coupled to memory enable circuitry 46 by way of the enable signal 56. The signal generating circuitry 44 outputs reset signal 58 and exception occurred signal 60 to bus 20. Outputs of the memory enable circuitry 46 are provided to memory 14 by way of multiple conductors 74.

Figure 3:
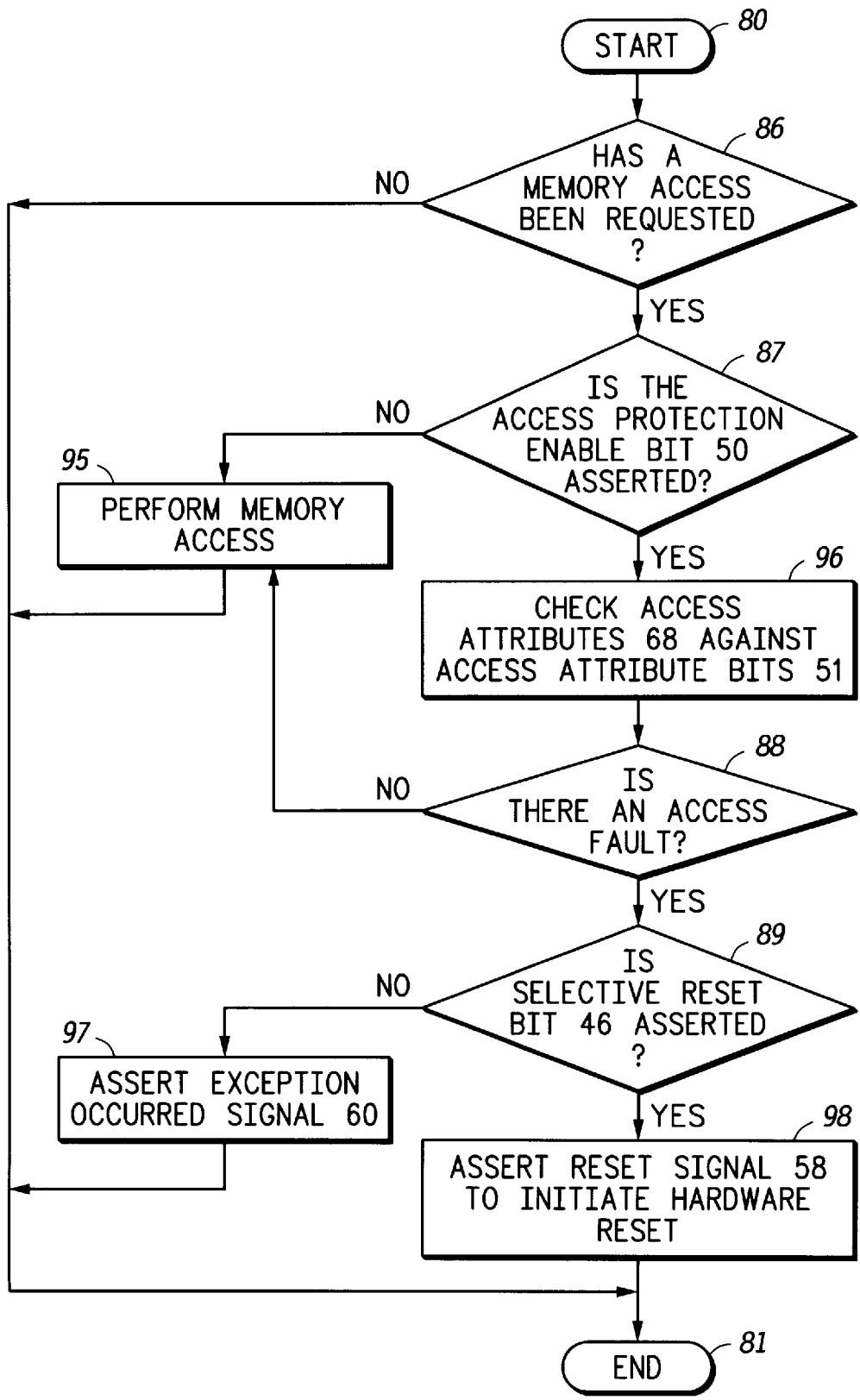
FIG. 3 illustrates, in flow diagram form, a process for performing access protection in an integrated circuit in accordance with one embodiment of the present invention.

FIG. 3 illustrates, in flow diagram form, one embodiment of a process for performing access protection in data processor 10 of FIG. 1. Referring to FIG. 3, flattened ovals 80–81 represent starting and ending points of the process, diamonds 86–89 represent decision points in the process, and rectangles 95–98 represent steps which are performed during the process.

Operation of the Preferred Embodiment

The operation of the present invention will now be described. The terms "assert" and "negate" will be used when referring to the rendering of a signal, status bit, or similar apparatus into its logically true or logically false state, respectively. If the logically true state is a logic level one, the logically false state will be a logic level zero. And if the logically true state is a logic level zero, the logically false state will be a logic level one.

The operation of the present invention will now be described. FIG. 3 illustrates a method of performing one embodiment of the present invention. An access protection enable bit 50 is software programmable by the authorized software developer to determine whether access privileges will be checked before accessing the memory. If this bit is asserted, access privileges will be checked before a memory access is allowed. Therefore, as illustrated in FIG. 3, if a memory access has been requested as in step 86, and the access protection enable bit 50 is asserted, the access privileges will be checked before allowing a memory access. On the other hand, if a memory access has been requested but the access protection enable bit 50 is not asserted, then a memory access will be allowed as in step 95 regardless of the access privileges.

In one embodiment of the present invention, access protection enable bit 50 and selective reset bit 48 are located in registers 40 which refer to locations in a programmer's model and are software programmable. In alternate embodiments, these bits may be implemented in a variety of ways, including, for example, mask programmable bits, write once bits, or write once out of reset bits. The representation of these bits or registers can be located in a variety of storage circuits such as, for example, masked memories, reprogrammable EEPROMs (Electrically Erasable Programmable Read Only Memory), RAM (Random Access Memory), or any other type of memory, latch, or storage circuitry.

Once a memory access has been requested, and the access protection enable bit 50 is determined to be asserted, then the access attributes 68 are checked against access attribute bits 51 found in registers 40 as illustrated in FIG. 2. Access attribute bits 50 provide information regarding what access or operation is allowed. These attributes can include supervisor or user mode; read, write, or execute; program or data; any combination of the above choices; or any other type of attribute of the information stored in a storage circuit.

In one embodiment of the present invention, as illustrated in FIG. 2, compare circuitry 42 uses the access attribute bits 51, access attributes 68, and other control signals 70 from bus 20 to determine whether the software has the necessary access privileges to access the requested areas of memory. In one embodiment of the present invention, other control signals 70 include one or more signals that are used to request an access to memory 14. If an access fault is not detected, meaning that the software had the necessary access privileges, then a memory access is allowed. If an access fault is detected, then the compare circuitry 42 asserts the access fault signal 52 which is then provided to signal generating circuit 44. Signal generating circuitry 44 accesses registers 40 to determine whether the selective reset bit 48 is asserted. In one embodiment of the present invention, the selective reset bit 48 is used to select a memory protection mode, while alternate embodiments can use a one or more selective reset bits or other bits to select one of a plurality of memory protection modes. In one embodiment of the present invention, a first memory protection mode can be used to generate a hardware interrupt, while another memory protection mode can be used to handle an access fault through software. Furthermore, alternate embodiments can include a plurality of protection modes related not just to memory, but to other components or circuits within an integrated circuit.

If the selective reset bit 48 is asserted, the signal generating circuitry 44 asserts reset signal 58 which initiates a hardware reset. If this selective reset bit 48 is not asserted and an access fault was detected, the signal generating circuitry 44 simply outputs an exception occurred signal 60, so that the access fault may be handled by a software exception handler in a prior art manner. In alternate embodiments, other methods for handling exception faults can be utilized instead of a software exception handler. Furthermore, the selective reset bit 46 is not limited to only two choices. For example, more than one bit can be used for the selective reset, where one of a plurality of choices is a hardware reset.

The authorized software developer has the choice of enabling the access protection circuitry by way of the access protection enable bit 50. If this bit 50 is asserted, the access protection circuitry 11 will check if the requested memory access is allowed. Otherwise, if bit 50 is not asserted, the data 72, address 66, and other control signals 70 will bypass the access protection circuitry 11 by way of the memory enable circuitry 46 and go directly to memory 14, regardless of the access privileges. If the access protection circuitry 11 is enabled, the authorized software developer has the choice of using the selective reset bit 48 to select a memory protection mode. If this selective reset bit 48 is not asserted, then any access fault will simply trigger a software exception fault by way of exception occurred signal 60. The exception fault may be handled by a software exception handler.

Once again, in alternate embodiments, a different sequence of events aside from a software exception handler can be implemented to address the access fault if the selective reset bit 48 is not asserted. In one embodiment, the option of not asserting the selective reset bit 48 has been maintained in the system because the use of a software exception handler aids in software debugging in the development portions of the software applications. Alternate embodiments may not present the authorized software developer with the choice of whether or not to use the hardware reset; in this case, a hardware reset would occur each time an access fault is detected.

In one embodiment of the present invention, if the authorized developer decides to assert the selective reset bit 48, it cannot be changed since this is a write once control bit. Therefore, this bit is usually not asserted until all debugging has been completed and the product is ready for shipping to the market. If this selective reset bit 48 has been asserted, then any access faults detected by the compare circuitry 42 and processed by signal generating circuitry 44 will assert the reset signal 58 which will initiate a hardware reset of the entire system. In one embodiment of the present invention, a hardware reset clears the current state of the data processor 10 as well as any status information contained in any of the registers of data processor 10. In alternate embodiments, a hardware reset removes power from some or all components of a data processing system (not shown), which includes data processor 10, and clears the volatile memories, leaving little or no traces of any information for the unauthorized users to rely upon. In yet other alternate embodiments, the hardware reset may power-down all or some of the circuitry within the integrated circuit 10, or may power-down all or some of the circuitry external to the integrated circuit 10. There are a variety of different ways to implement a hardware reset depending on the needs of the design of the integrated circuit 10.

The present invention holds many benefits over techniques presently used to ensure security. Since the selective reset bit 48 can initiate a hardware reset which clears the present state of the data processor 10 as well as other status information, it is extremely difficult to trace back through the sequence of events leading to this access fault. Therefore, unauthorized users will have great difficulty retracing the sequence of instructions that lead to the access fault. Furthermore, this selective reset bit 48 is difficult to detect since it is a single bit within a single register making it difficult to locate or determine the bit's functionality. In alternate embodiments, the selective reset can be more than a single bit, depending on what is required for the particular integrated circuit being designed. Only authorized users have access to any information disclosing the location and function of this bit. Also, as mentioned above, the hardware reset restarts the system and clears any stored information.

The embodiments of the present invention are very simple for the authorized software developers to implement. It also requires minimal hardware which leads to low cost, simplicity, and little overhead. The entire access protection circuitry 11 adds little overhead in cost and space to an integrated circuit 10, yet it provides an effective method of security which can apply not only to memory access as described in one embodiment of the present invention, but to any type of data storage found in the data processing system which includes data processor 10. Note that data processor 10 can be the entire data processing system for some embodiments of the present invention. Furthermore, alternate embodiments can be used to protect any block of circuitry performing predetermined functions where authorized developers wish to restrict access to general and unauthorized users. In alternate embodiments, the access protection circuitry 11 may simply include the necessary circuitry to allow a hardware reset upon detection of an access fault, or can include other circuitry to implement a variety of other options. For example, additional circuitry can be designed to generate a hardware reset if another type of fault is detected.

While the present invention has been illustrated and described with reference to specific embodiments, further modifications and improvements will occur to those skilled in the art. It is to be understood, therefore, that this invention is not limited to the particular forms illustrated and that it is intended in the appended claims to cover all modifications that do not depart from the spirit and scope of this invention.

What is claimed is:

1. An integrated circuit, comprising:
   a bus;
   a processing unit coupled to said bus;
   a memory; and
   access protection circuitry coupled between said bus and said memory;
   wherein said access protection circuitry comprises:
      a first input for receiving an access request, the access request requesting an access to said memory;
      a second input for receiving a received access attribute of the access request;
      a storage circuit for storing a stored access attribute of at least a portion of said memory;
      compare circuitry, coupled to said storage circuit, said compare circuitry performing a compare operation in response to receiving the access request, said compare circuitry selectively asserting an access fault signal in response to the compare operation;
      selection circuitry for selecting at least one of a first memory protection mode and a second memory protection mode; and
      signal generation circuitry, coupled to said compare circuitry for receiving the access fault signal and coupled to said selection circuitry, said signal generation circuitry asserting a reset signal if the access fault signal is asserted and the first memory protection mode is selected.

2. An integrated circuit as in claim 1, wherein assertion of the reset signal initiates a hardware reset of at least a portion of the integrated circuit.

3. An integrated circuit as in claim 1, wherein said signal generation circuitry asserts an exception occurred signal if the access fault signal is asserted and the second memory protection mode is selected.

4. An integrated circuit as in claim 1, wherein said selection circuitry comprises:
   at least a first bit of a programmable register circuit.

5. An integrated circuit as in claim 4, wherein said storage circuit comprises:
   at least a second bit of the programmable register circuit.

6. An integrated circuit as in claim 5, further comprising:
   at least a third bit of the programmable register circuit, coupled to said compare circuitry, said at least a third bit of the programmable register circuit selectively disabling said compare circuitry.

7. An integrated circuit having a storage unit which stores information to be protected, said integrated circuit comprising:
   at least a first conductor which transfers an access request, the access request requesting an access to said storage unit;
   at least a second conductor for transferring an access attribute of the access request;
   a storage circuit for storing an access attribute of at least a portion of said storage unit;
   compare circuitry, coupled to said at least a first conductor, coupled to said at least a second conductor, and coupled to said storage circuit, said compare circuitry performing a compare operation in response to receiving the access request, said compare circuitry selectively asserting an access fault signal in response to the compare operation;
   selection circuitry for selecting at least one of a first storage unit protection mode and a second storage unit protection mode; and
   signal generation circuitry, coupled to said compare circuitry and coupled to said selection circuitry, said signal generation circuitry asserting a reset signal if the access fault signal is asserted and the first storage unit protection mode is selected.

8. An integrated circuit as in claim 7, further comprising:
   a second storage circuit, coupled to said compare circuitry, said second storage circuit selectively disabling said compare circuitry.

9. An integrated circuit as in claim 7, wherein assertion of the reset signal initiates a hardware reset of at least a portion of the integrated circuit.

10. An integrated circuit as in claim 7, wherein said selection circuitry comprises:
    at least a first bit of a programmable register circuit.

11. An integrated circuit as in claim 10, wherein said storage circuit comprises:
    at least a second bit of the programmable register circuit.

12. An integrated circuit as in claim 11, further comprising:
    at least a third bit of the programmable register circuit, coupled to said compare circuitry, said at least a third bit of the programmable register circuit selectively disabling said compare circuitry.

13. An integrated circuit as in claim 7, wherein said storage unit comprises a memory.

14. An integrated circuit as in claim 7, wherein said signal generation circuitry asserts an exception occurred signal if the access fault signal is asserted and the second storage unit protection mode is selected.

15. An integrated circuit as in claim 7, wherein the integrated circuit is a data processor.

16. A method for providing access protection of a storage unit in an integrated circuit, the method comprising the steps of:

selecting at least one of a first storage unit protection mode and a second storage unit protection mode;

storing a stored access attribute of at least a portion of the storage unit;

determining if an access request to the storage unit has been received;

if an access request to the storage unit has been received, receiving a received access attribute which corresponds to the access request;

if the access request to the storage unit has been received, comparing the stored access attribute with the received access attribute; and if the stored access attribute does not match the received access attribute, and if the first storage unit protection mode is selected, asserting a reset signal.

17. A method as in claim 16, further comprising the step of:

in response to asserting the reset signal, performing a hardware reset of at least a portion of the integrated circuit.

18. A method as in claim 16, further comprising the step of:

selectively disabling said steps of comparing and asserting by way of at least one user programmable bit.

19. A method as in claim 16, wherein the integrated circuit is a data processor.

20. A method as in claim 16, further comprising the step of:

if the stored access attribute does not match the received access attribute, and if the second storage unit protection mode is selected, asserting an exception occurred signal.

21. A method as in claim 20, further comprising the step of:

in response to asserting the exception occurred signal, initiating exception processing.

\* \* \* \* \*